United States Patent [19]

Scobie et al.

[11] Patent Number: 4,682,758

[45] Date of Patent: Jul. 28, 1987

[54] DISK/STEM CONNECTION APPARATUS FOR BUTTERFLY VALVE

[75] Inventors: William B. Scobie; Michael L. Wagberg, both of Houston, Tex.

[73] Assignee: Keystone International, Inc., Houston, Tex.

[21] Appl. No.: 836,541

[22] Filed: Mar. 5, 1986

[51] Int. Cl.⁴ ............................................. F16K 1/22
[52] U.S. Cl. ..................................... 251/84; 251/308
[58] Field of Search ............... 251/305, 306, 307, 308, 251/356, 84

[56] References Cited

U.S. PATENT DOCUMENTS

| | | | |
|---|---|---|---|
| 2,882,010 | 4/1959 | Bryant | 251/306 |
| 3,314,642 | 4/1967 | Kautz et al. | 251/307 |
| 3,425,439 | 2/1969 | Duffey et al. | 251/308 |
| 3,666,234 | 5/1972 | Scaramucci | 251/306 |
| 3,997,142 | 12/1976 | Broadway | 251/307 |
| 4,006,883 | 2/1977 | Hilsheimer | 251/307 |
| 4,291,863 | 9/1981 | Gachot | 251/308 |

Primary Examiner—Alan Cohan
Assistant Examiner—Sheri M. Novack
Attorney, Agent, or Firm—Browning, Bushman, Zamecki & Anderson

[57] ABSTRACT

A means for adjusting the relative positioning of a valve closure element with respect to a valve seat is formed by a hub on the closure element having a valve stem receiving bore and at least two generally opposed threaded passages intersecting the bore. Threaded members are received in each bore to engage the valve stem from generally opposite sides thereof. Movement of the threaded members adjusts the relative positioning of the closure element with respect to the valve seat and valve stems while securing the closure element to the latter.

19 Claims, 6 Drawing Figures

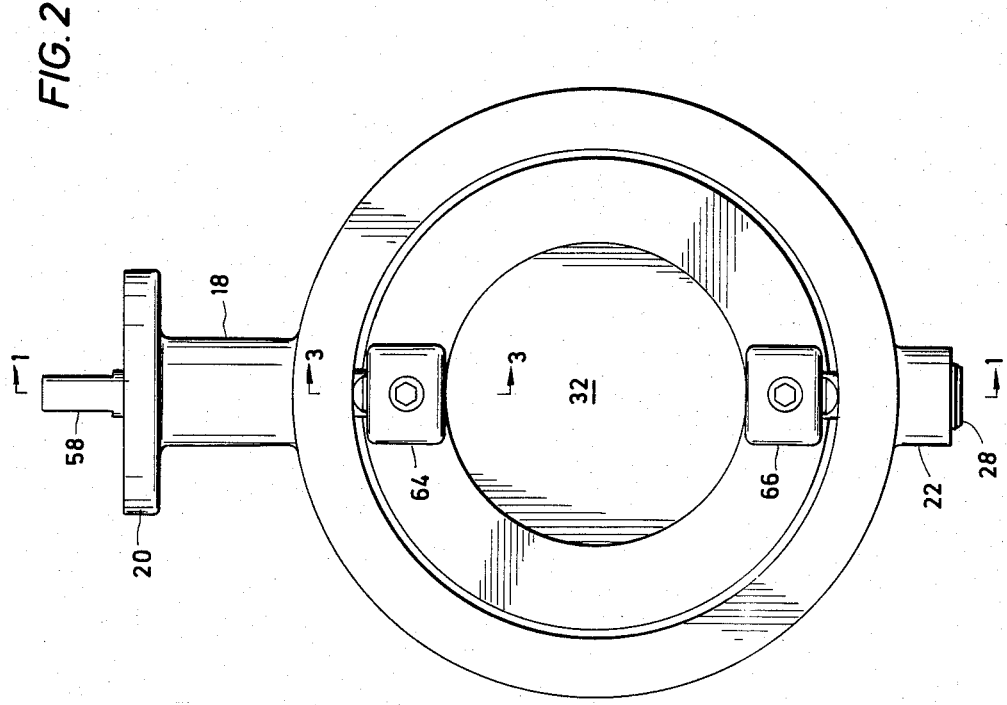
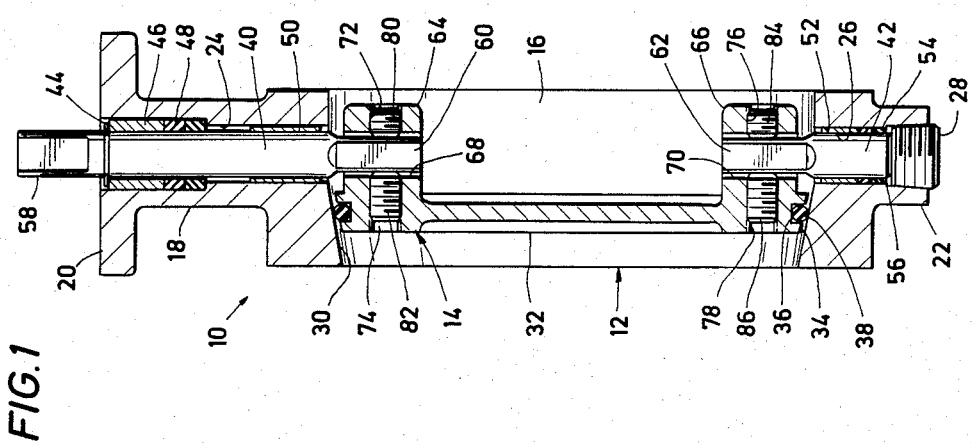

DISK/STEM CONNECTION APPARATUS FOR BUTTERFLY VALVE

BACKGROUND OF THE INVENTION

1. Field of the Invention

The present invention relates to fluid control valves and more particularly to a means and method for connecting the disk of a butterfly valve to the stems in such fashion as to allow for adjustability in positioning of the valve disk relative to the valve seat.

2. Description of the Prior Art

Valves employing pivotal closure elements, such as butterfly valves, are widely used in industry for fluid handling and control. In particular, butterfly valves employing resilient sealing means engaging rigid metal members are extensively used in a wide variety of environments since a good pressure tight seal can be obtained. This is at least in part due to the deflection or resiliency of the sealing means carried by either the valve disk or the valve body. However, it still remains a problem to achieve the necessary accuracy in machining and dimensioning to be able to control the positioning of the disk relative to the seat in order to achieve the necessary accuracy of alignment for a tight seal. This alignment problem becomes even more apparent with large diameter valves, non-circular valves, or any valve which uses a split stem mounting arrangement for the disk. This split stem arrangement increases the requirements for accuracy in machining of parts as well as increasing the possibility for misalignment of the valve element with respect to the valve seat during assembly, after repair, or after periods of use.

SUMMARY OF THE INVENTION

The present invention overcomes the above-mentioned requirement for accurate machining and tight tolerances by providing a means whereby the valve element can be adjusted with respect to the valve seat to ensure a tight sealing fit therebetween. The present invention, which is applicable to many styles of valves, is formed by a closure element assembly to be mounted in a valve housing which defines a flow passage therethrough and an annular seat in surrounding relationship to the flow passage. The closure element assembly includes a closure member having a circumferential profile adapted to mate in sealing relationship with the valve seat, at least one hub secured to the closure member and having a profiled-through bore receiving a valve stem therein, the valve stem being rotatably mounted in the valve body and extending along a diameter of the flow passage, and means for adjustably securing the closure member to the valve stems formed by at least two generally opposing threaded passages intersecting the bore and threaded members received in each passage to engage the valve stem providing relative positioning thereto by the degree of insertion of each threaded member in their respective passage.

BRIEF DESCRIPTION OF THE DRAWINGS

The present invention will now be described by way of example with reference to the accompanying drawings in which:

FIG. 1 is a section view taken along line 1—1 of FIG. 2;

FIG. 2 is a plan view of a butterfly valve incorporating the present invention;

DETAILED DESCRIPTION OF THE PREFERRED EMBODIMENT

Figure 3:
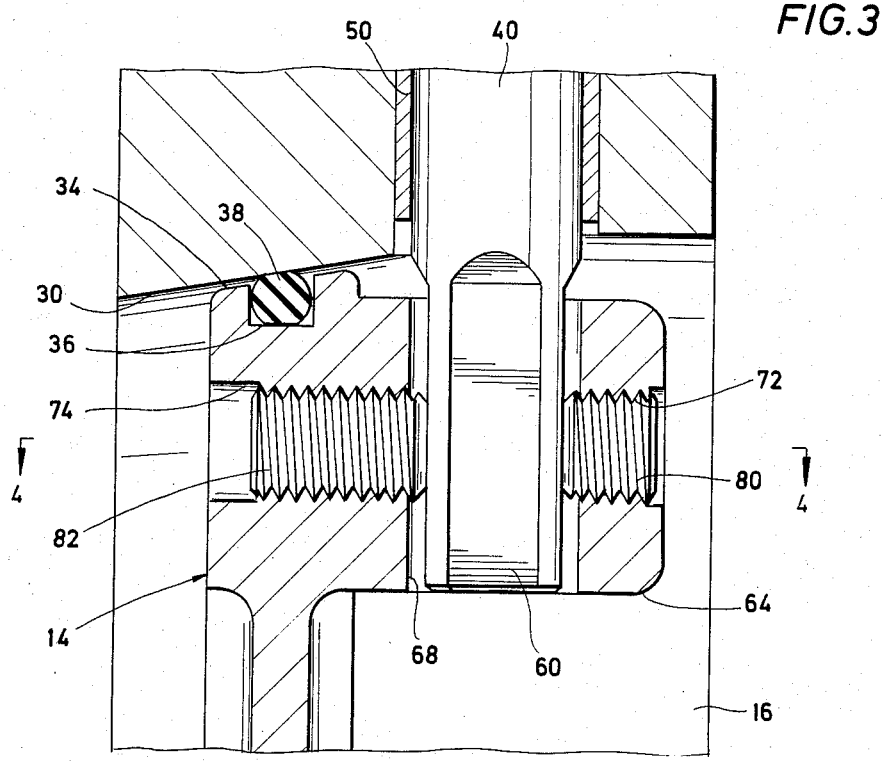
FIG. 3 is a detailed section taken along line 3—3 of FIG. 2.
Figure 4:
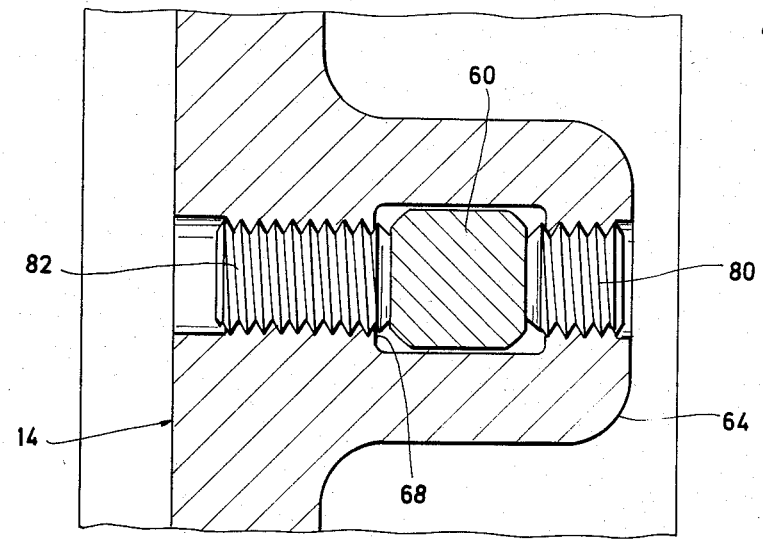
FIG. 4 is a detailed section taken along line 4—4 of FIG. 3.

The present invention has been shown as it would be utilized in a standard round butterfly control valve. It should be noted that the invention could be used in butterfly valves of other shapes and would be particularly useful in obround butterfly valves. The invention could also be used with other types of valves, particularly where it is desirable to relax tolerances and/or reduce machining requirements without any loss in sealing effectiveness.

The valve 10 is formed by a valve body 12 and a closure assembly 14. The valve body is a rigid member defining a fluid flow passage 16 with a cylindrical neck 18 extending radially from one side of the body and topped by an enlarged mounting flange 20. Opposite the cylindrical neck 18 is a boss 22. A first bore 24 is formed in neck 18 and a second bore 26 is formed in boss 22, both bores being in axial alignment along a diameter of passage 16. The bore 26 is closed at its lower end by plug 28. An annular seating surface 30 surrounds the flow passage 16. The valve closure assembly 14 is formed by a disk member 32 defining a sealing surface 34 profiled to be received in the annular seating surface 28. An annular groove 36 in the surface 34 receives an O-ring 38 therein. An upper stem 40 is received in first bore 24 of the valve body, while a lower stem 42 is received in second bore 26. The stems 40, 42 are axially aligned extending into the flow passage 16 along a diameter thereof. The upper stem 40 is mounted by a packing ring 44, a bushing 46, packing 48 and bearing 50, while the lower stem 42 is mounted by bearing 52, packing 54 and thrust washer 56. The upper end 58 of the upper stem 40 extends beyond the flange 20 and is preferably profiled to receive thereon a valve actuation member (not shown) such as a turning wheel or linkage. The inner ends 60, 62 of stems 40, 42, respectively, are preferably profiled to a polygonal geometric section, for reasons which will be explained here below. As an alternative, these ends could be profiled to have a roughened, for example, knurled, high friction or textured surface (not shown).

The disk member 32 is provided with at least one hub 64, 66 attached to the disk member 32 on opposite edges of one side thereof in alignment with the respective upper stem 40 and lower stem 42. Each hub 64, 66 is provided with a throughbore 68, 70 which preferably is profiled to receive therein the profiled ends 60, 62 of the upper and lower stems 40, 42. Each bore 68, 70 is intersected by at least two generally opposing threaded passages 72, 74, 76, 78. A threaded member 80, 82, 84, 86 is received in each respective passage.

In conventional valve assemblies, the closure element is fixedly secured to the valve stems. The mounting of the stems in the valve body determines to a great extent the relative positioning of the valve element with respect to the valve seat along the direction of fluid flow. If there is any inaccuracy in the machining of the valve body or valve stems or mounting of the valve stems in the body, there is no possibility for adjustment to correct for any error. The only adjustment possible is axially of the valve stems, and this will not necessarily effect a tighter sealing engagement with the valve seat. The present invention provides means to adjust the valve element with respect to the valve seat in the direction of fluid flow thereby assuring formation of a good tight seal.

The present invention can be utilized when the valve is assembled, when the O-ring 38 or other sealing means is replaced, or whenever it is necessary to improve the sealing action of the valve. When using this invention it is not necessary to manufacture the parts with as close tolerances or high degree of machining as was previously required. Rather, it is possible to assemble the valve in conventional fashion and then to adjust the relative positioning of the closure member with respect to the valve seat by appropriate adjustment of the threaded members 80, 82, 84, 86 against the inner ends 60, 62 of the valve stems 40, 42. The planar surfaces of the polygonal profiles provide purchase for the threaded members. It will also be appreciated that these adjustements will, to a certain degree, allow for compensation for warped closure members which heretofore would have provided an unsatisfactory seal.

While two hubs have been shown, it is clearly within the purview of the present invention to provide a single, centrally located hub with a single valve stem spanning the entire diameter of the flow passage. In such a case, the valve stem might preferably have a knurled, textured or other friction gripping surface rather than the geometric profile illustrated in order to enable easier passage of the stem through the bore of the hub. This surface would provide a suitable grip for the threaded members, much in the same fashion as the previously described flat surfaces of the geometric profile.

Figure 5:
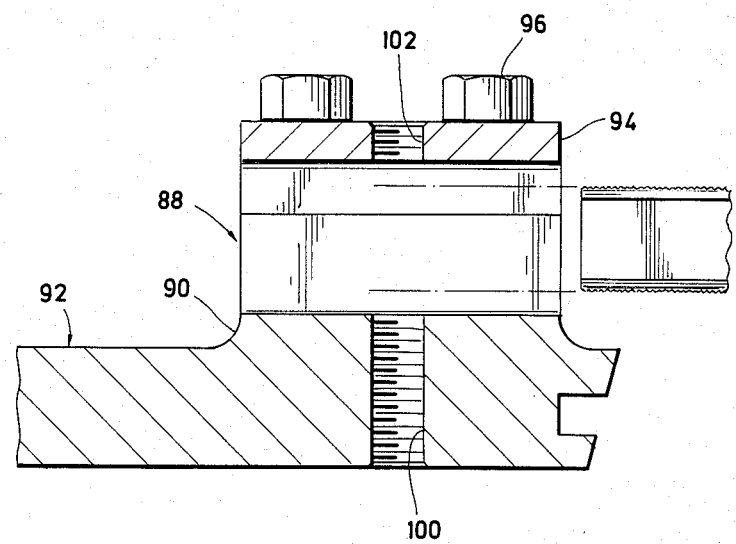
FIG. 5 is a section through an alternate embodiment of the hub.
Figure 6:
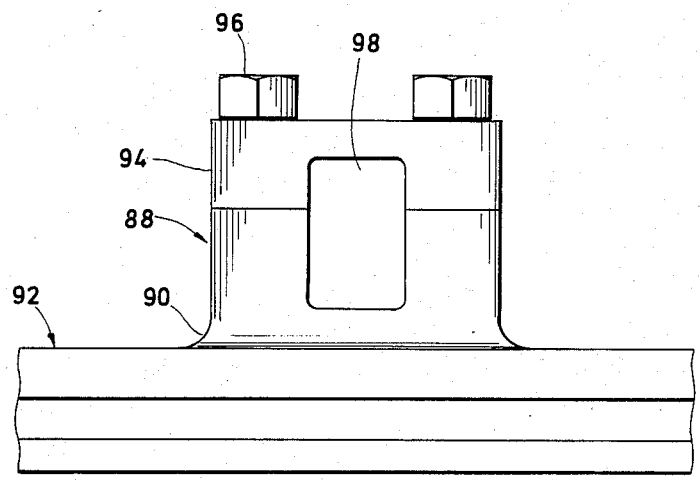
FIG. 6 is a side elevation of the hub of FIG. 5.

As a further alternative, as shown in FIGS. 5 and 6 the hub 88 could be made with a base portion 90 integral with the disk member 92 and a cover portion 94 assembled therewith by attachment means, such as bolts or screws 96 engaging the base portion 90. The base portion 90 and cover portion 94 could together define a profiled bore 98 in the manner of the bore illustrated. Threaded passages 100, 102 would be in the base portion 90 and cover portion 94, respectively.

As a still further alternative, the present invention could be provided with more than the illustrated two threaded passages intersecting the bore of the hub. Each such passage would be provided with an appropriate threaded member. Such an arrangement, for example with three threaded passages and members, might prove to provide more accurate alignment than previously possible, especially in the case of smaller valve assemblies.

It is expected that the threaded members 80, 82, 84, 86 engaging in threaded passages 72, 74, 76, 78, respectively, will provide an adequate seal. It is, of course, possible to provide an additional seal (not shown) which preferably will be of a removable type to allow future access to the threaded member beneath it. Permanent seals, such as epoxy, could be used if the need arose.

The present invention may be subject to many modifications and changes without departing from the spirit or essential characteristics thereof. The above-described embodiment should therefore be deemed to be illustrative and not exclusive as to the scope of the invention which is defined by the appended claims.

What is claimed is:

1. A valve comprising:
   a valve body defining a flow passage therethrough and an annular seat in surrounding relationship to said flow passage;
   a closure assembly mounted within said valve body for movement between open and closed positions to control the flow of fluid through said passage, said assembly comprising at least one valve stem rotatably mounted in said housing and extending into said passage along a diameter thereof, a closure element having a circumferential profile matable with said annular seat, and means for mounting said closure element on said at least one valve stem including at least one hub fixed to said closure element and defining a bore receiving said at least one valve stem therein, at least two threaded passages intersecting said bore in general opposition, and at least two threaded members each threadedly received in a respective one of said passages to engage from opposite sides of said stem whereby adjusting said threaded members changes the relative positioning of said closure element with respect to said valve stem and said valve seal.

2. A valve according to claim 1 wherein said at least one hub forms an integral portion of said closure element.

3. A valve according to claim 1 wherein each said valve stem and said bore having matching polygonal cross sections and said passages intersect said bore at opposite sides of said polygonal section.

4. A valve according to claim 1 wherein said hub is located on said element substantially centrally of said flow passage and said valve stem is a single member traversing said flow passage.

5. A valve according to claim 4 wherein said valve stem and said bore have like transverse sections and said valve stem is provided with a friction gripping surface to be engaged by said threaded members.

6. A valve according to claim 1 wherein said at least one hub comprises a base portion secured to said closure element and a cover portion detachably secured to said base portion, said base portion and said cover portion together defining said bore.

7. A valve according to claim 1 wherein said at least one valve stem comprises a pair of axially aligned stems rotatably mounted in said valve body entering said flow passage from diametrically opposite sides; and
   said at least one hub comprises a pair of hubs fixed to one side of said valve element adjacent the edges thereof with the bores of said hubs in axial alignment.

8. A valve according to claim 7 wherein said valve stems and said hub bores have like cross sections.

9. A valve according to claim 7 wherein inner ends of said valve stems are profiled for engagement by said threaded members.

10. A valve according to claim 7 wherein said hubs are on the downstream side of said closure element.

11. A valve according to claim 10 wherein at least one of said threaded passages is accessible from the upstream side of said closure element and another threaded passage is accessible from the downstream side.

12. A valve according to claim 1 wherein said at least two threaded passages are aligned parallel to the axis of said flow passage.

13. A valve according to claim 1 wherein said at least two threaded passages are aligned so as to move said closure element in the direction of flow through said passage, 14. Means to adjustably mount a valve closure element in a fluid flow passage of a valve body so as to assure fluid-tight engagement with a valve seat defined by said valve body, said valve closure element being mounted on at least one valve stem for pivotal mounting in said housing between open and closed positions to control fluid flow through said passage, said means comprising:

at least one hub on said valve closure element having a valve stem receiving bore extending along a diameter of said fluid flow passage, at least two generally opposing threaded passages in said hub intersecting said bore, and at least two threaded members each received in a respective one of said threaded passages to engage said valve stem from opposing sides to adjustably position said element with respect thereto thus likewise positioning it relative to the valve seat to effect fluid-tight sealing.

15. Means according to claim 14 wherein said at least one hub is integral with said closure element.

16. Means according to claim 14 wherein said at least one hub comprises a pair of hubs disposed on one side of said closure element near the edges thereof with said bores in axial alignment.

17. Means according to claim 14 wherein at least one of said at least two threaded passages is accessible from each side of said valve element.

18. Means according to claim 14 wherein said hub bores have a transverse section profiled to the transverse section of the valve stem to be received therein.

19. Means according to claim 14 wherein each said hub comprises a base secured to said closure element and a cover detachably secured thereto, said base and said cover defining said bore and each said base and said cover having at least one threaded passage intersecting said bore.

* * * * *